No. 837,367. PATENTED DEC. 4, 1906.
A. WOOD.
APPARATUS FOR GUIDING FABRICS.
APPLICATION FILED MAR. 15, 1905.
10 SHEETS—SHEET 2.
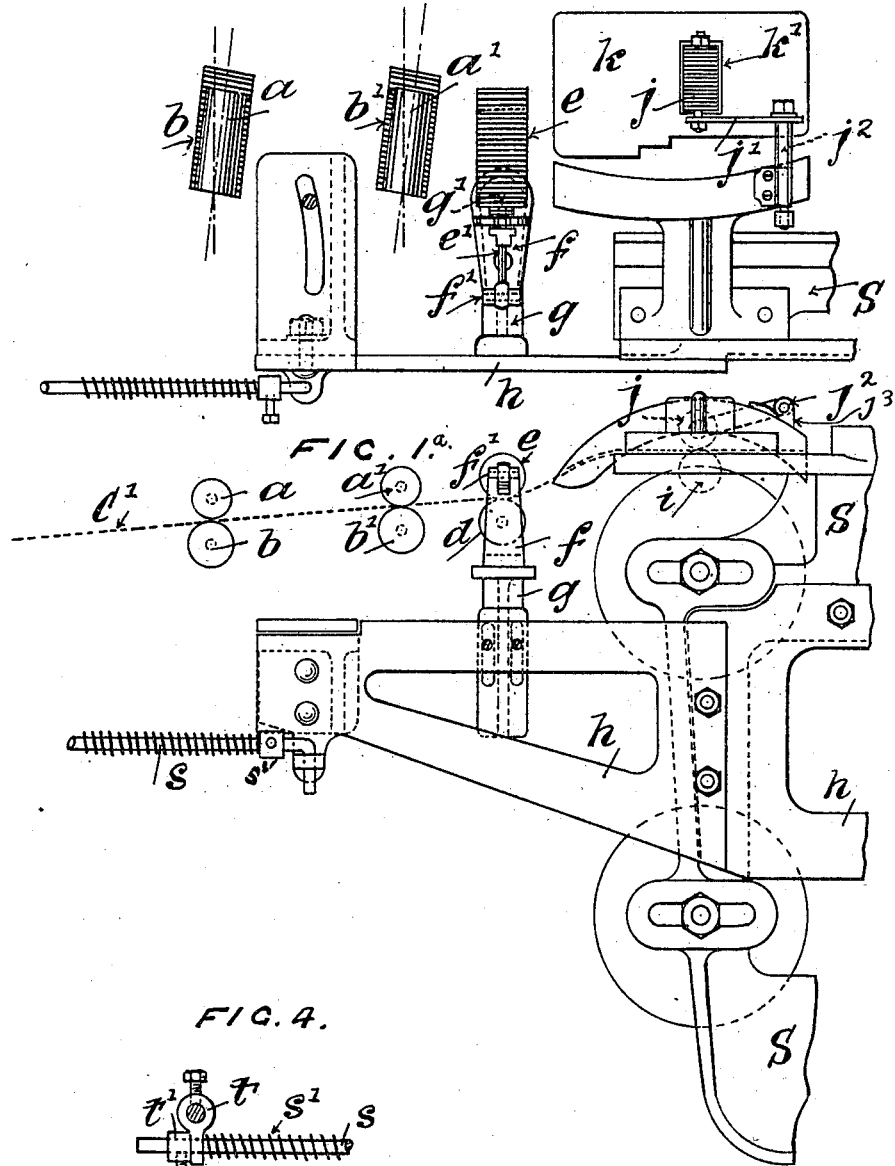
WITNESSES.
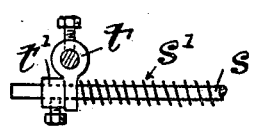
INVENTOR.
Abraham Wood.
By his Attorneys

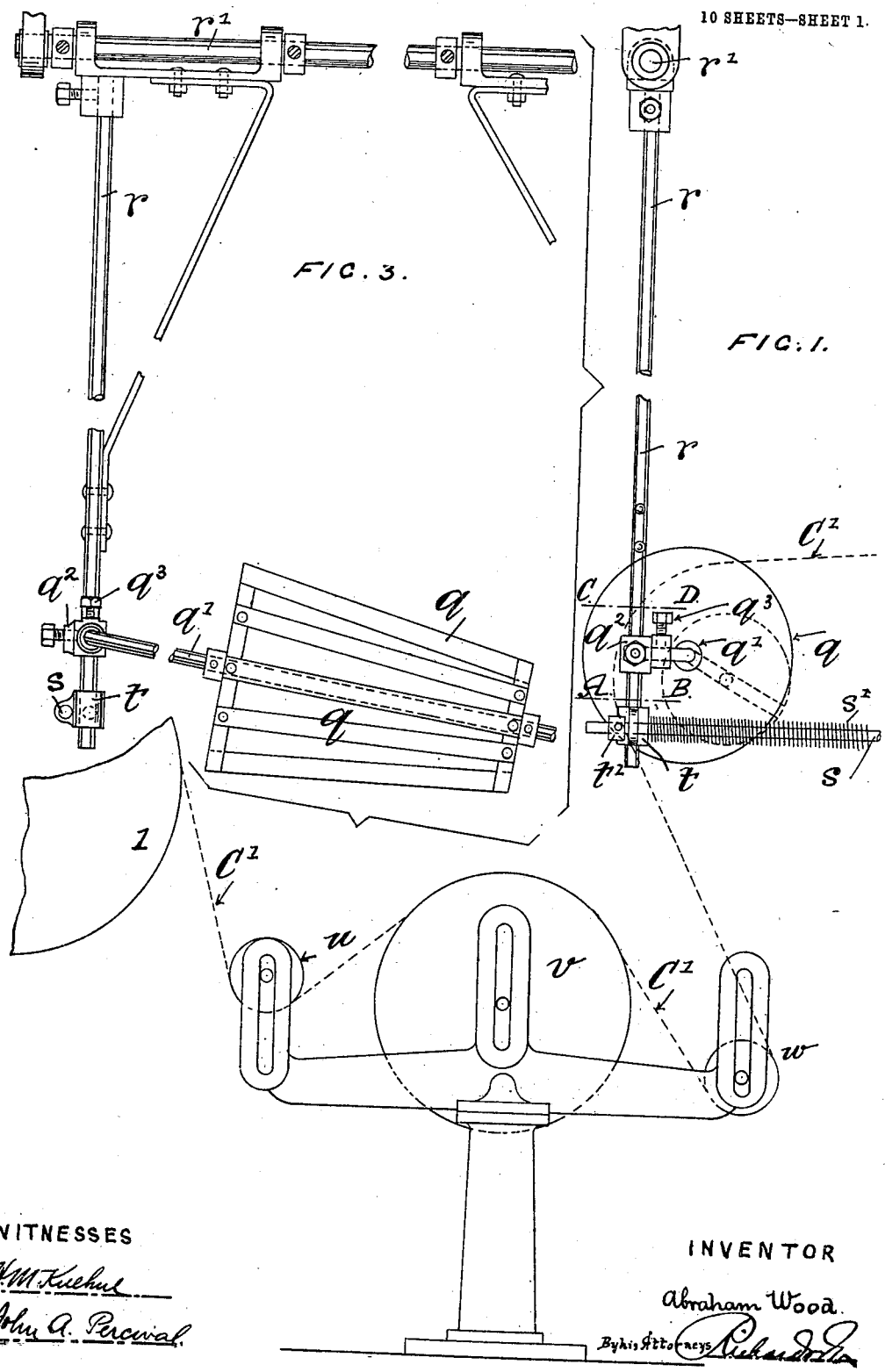

No. 837,367. PATENTED DEC. 4, 1906.
A. WOOD.
APPARATUS FOR GUIDING FABRICS.
APPLICATION FILED MAR. 15, 1905.
10 SHEETS—SHEET 3.
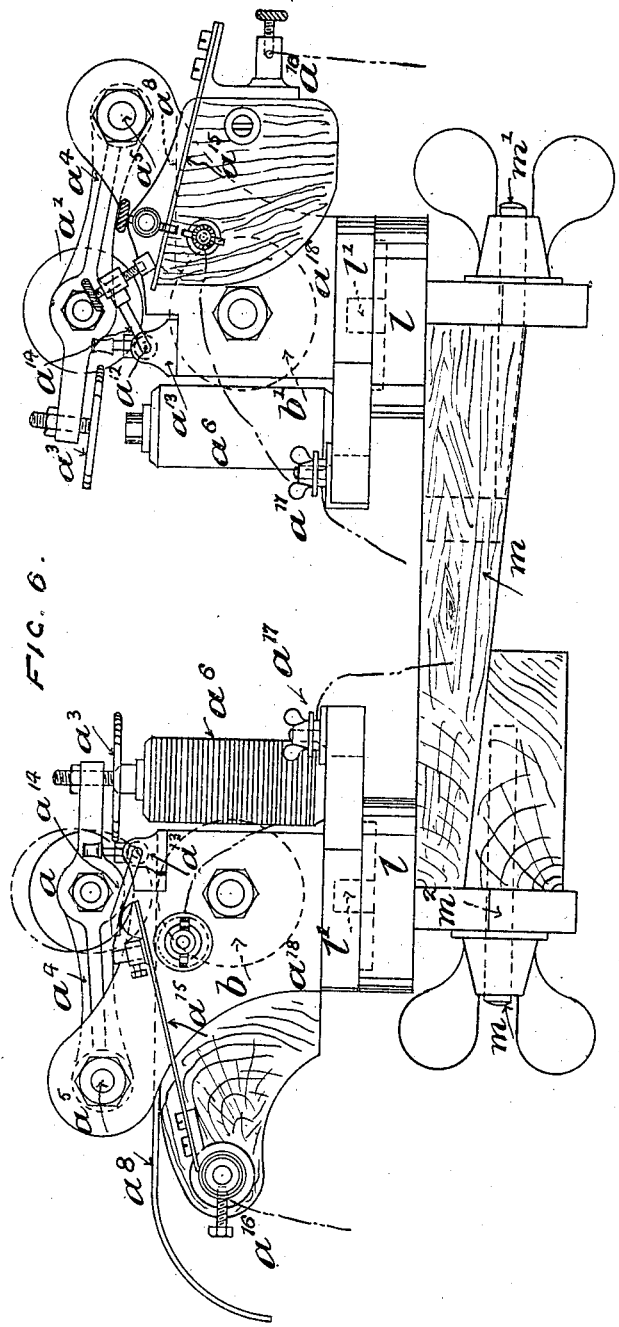
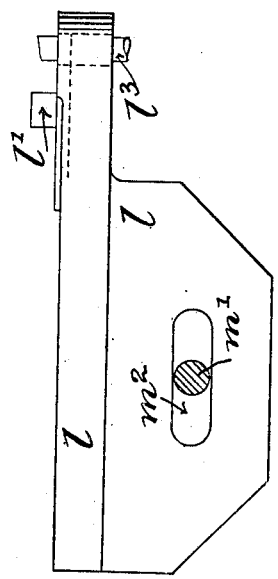
WITNESSES.
INVENTOR
Abraham Wood.
By his Attorneys

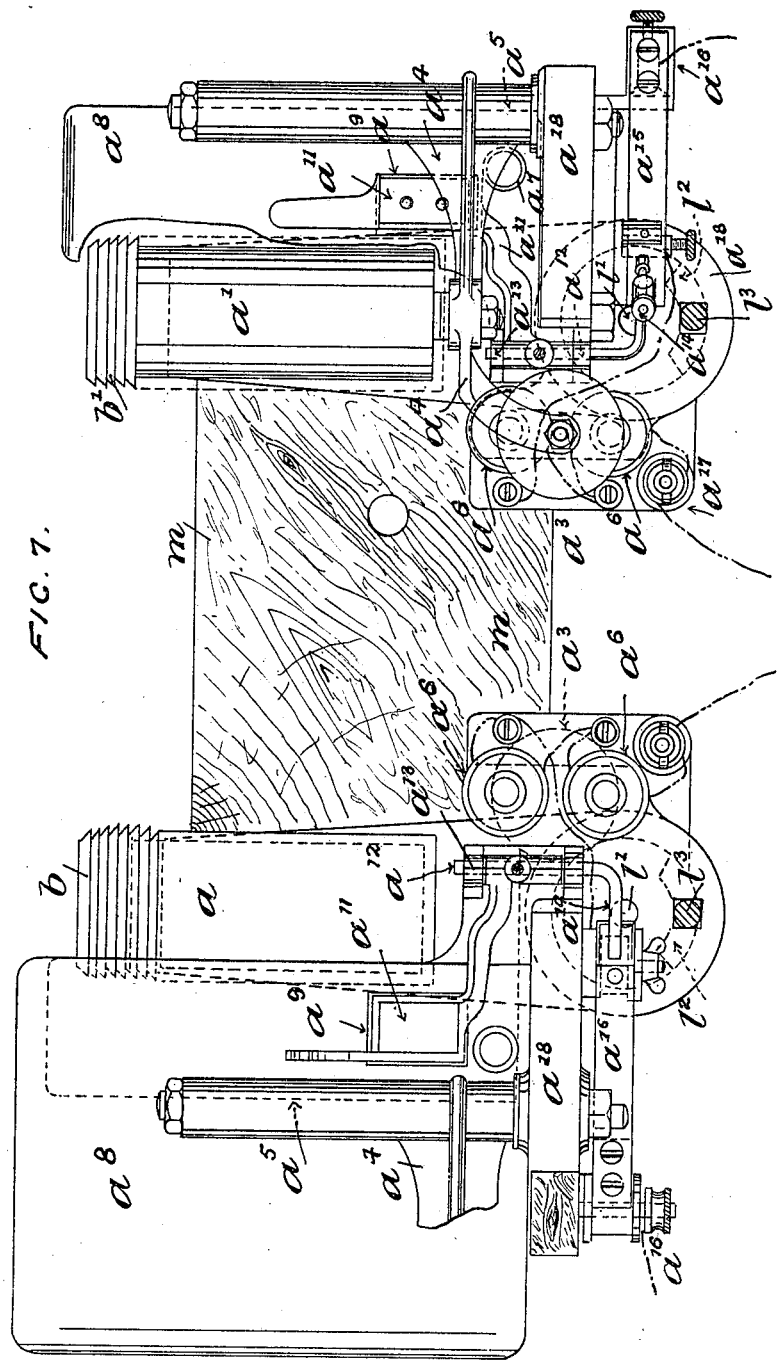

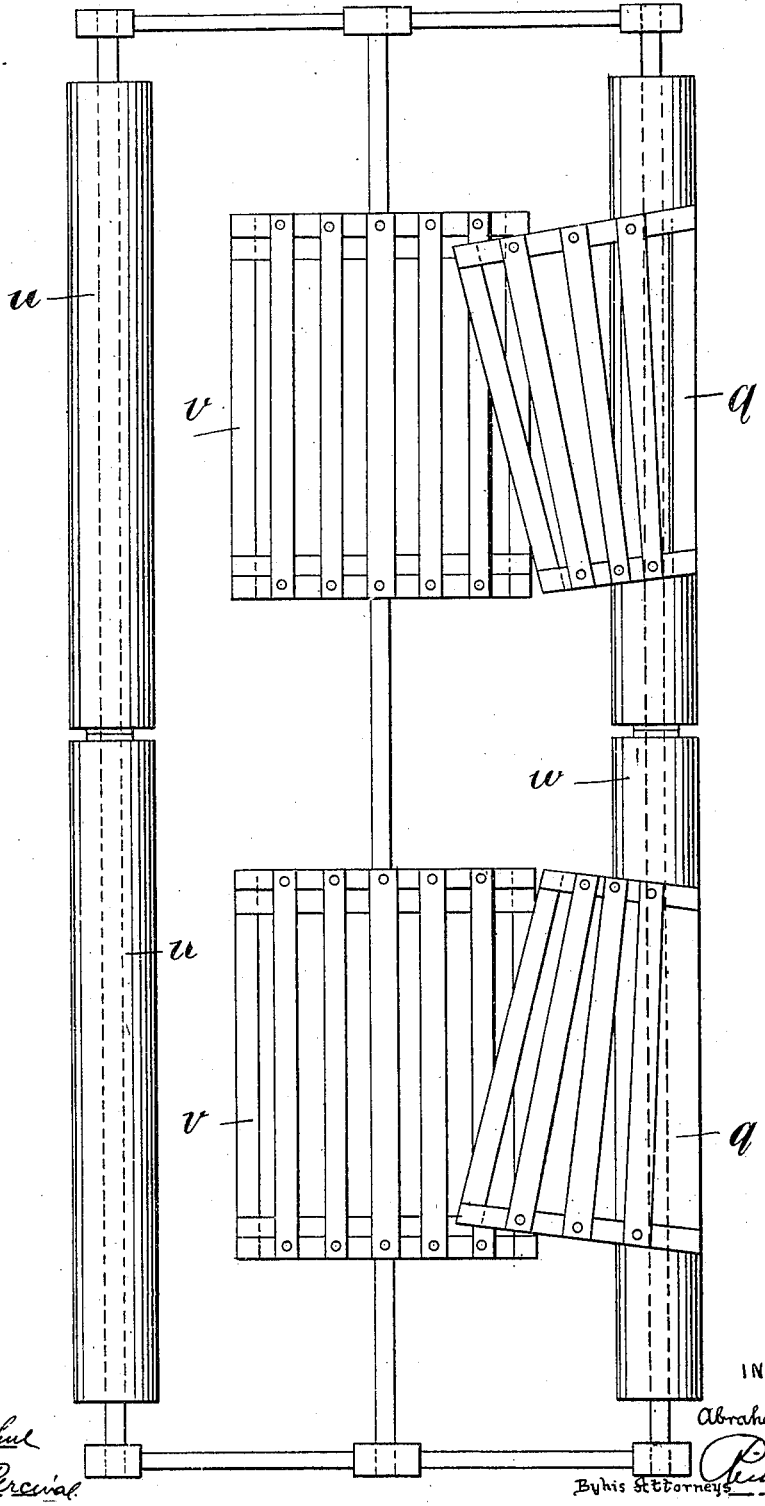

No. 837,367. PATENTED DEC. 4, 1906.
A. WOOD.
APPARATUS FOR GUIDING FABRICS.
APPLICATION FILED MAR. 15, 1905.
10 SHEETS—SHEET 6.
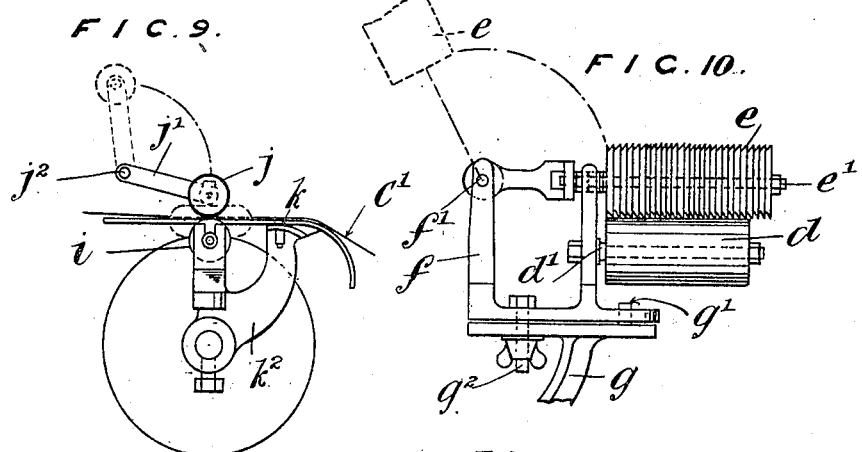
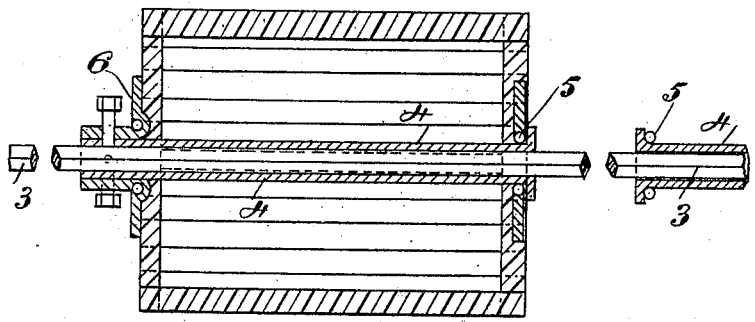
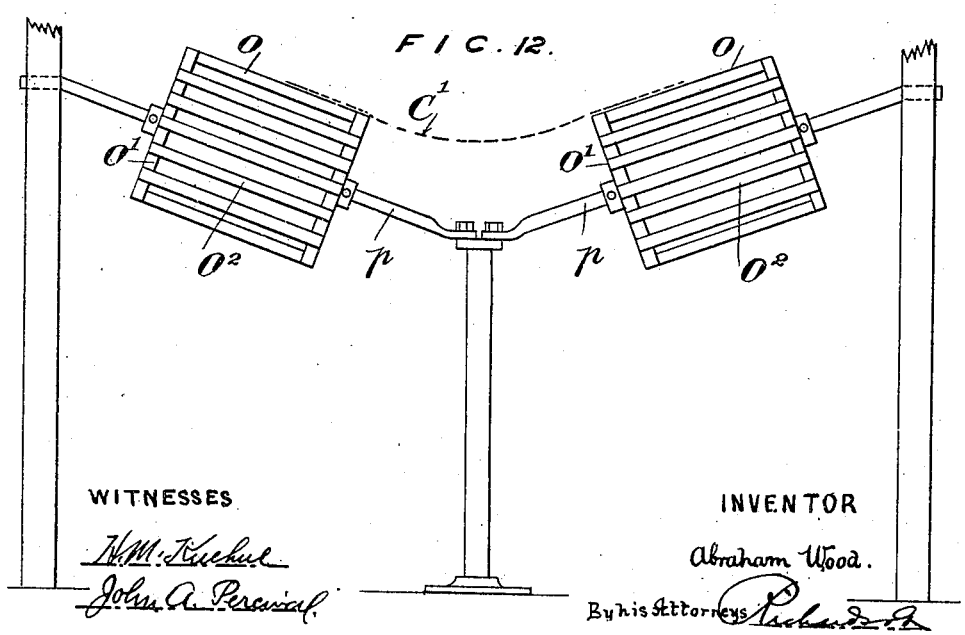
WITNESSES
INVENTOR
Abraham Wood.
By his Attorneys

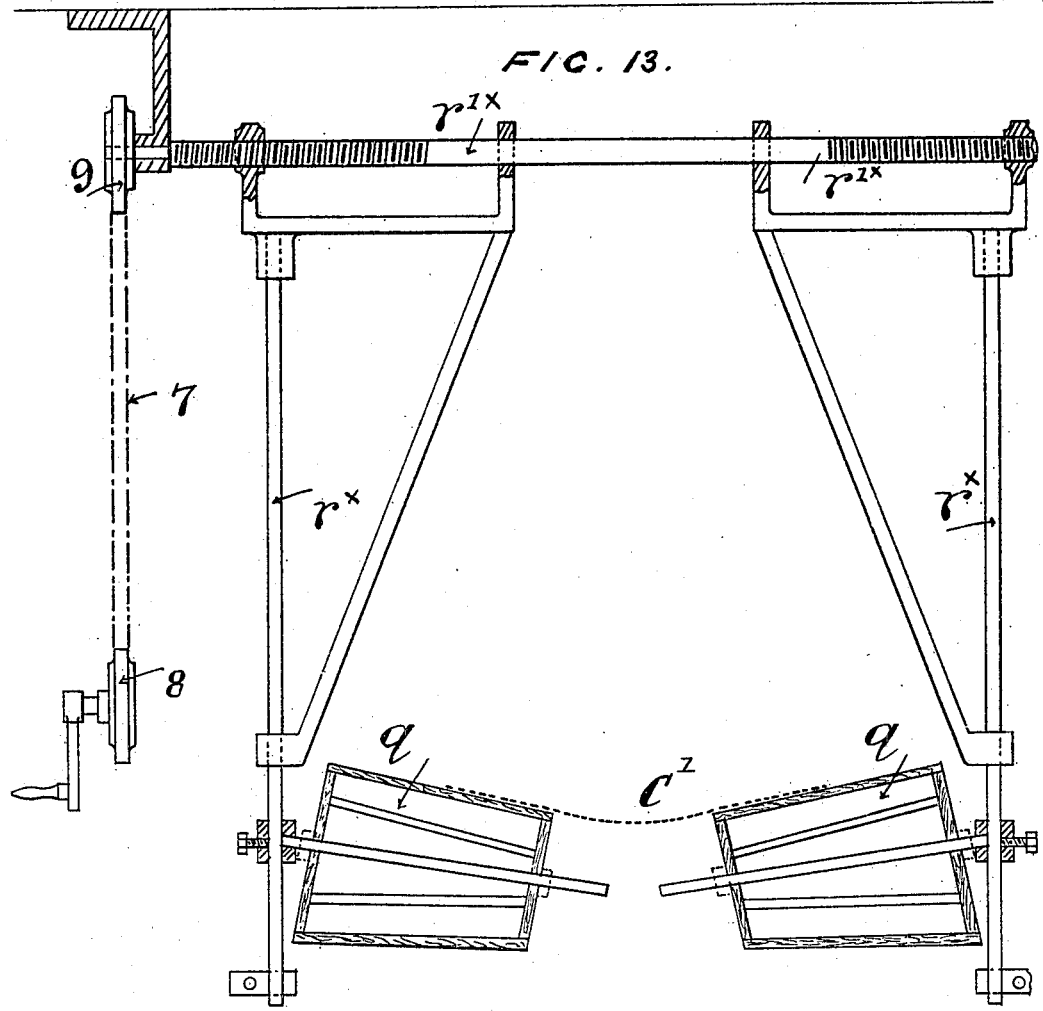

No. 837,367. PATENTED DEC. 4, 1906.
A. WOOD.
APPARATUS FOR GUIDING FABRICS.
APPLICATION FILED MAR. 15, 1905.

10 SHEETS—SHEET 8.

WITNESSES.

INVENTOR
Abraham Wood
By his attorney

No. 837,367. PATENTED DEC. 4, 1906.
A. WOOD.
APPARATUS FOR GUIDING FABRICS.
APPLICATION FILED MAR. 15, 1905.

10 SHEETS—SHEET 10.

WITNESSES.
INVENTOR.
Abraham Wood.
By his Attorneys

UNITED STATES PATENT OFFICE.

ABRAHAM WOOD, OF RAMSBOTTOM, ENGLAND.

APPARATUS FOR GUIDING FABRICS.

No. 837,367.  Specification of Letters Patent.  Patented Dec. 4, 1906.

Application filed March 15, 1905. Serial No. 250,270.

*To all whom it may concern:*

Be it known that I, ABRAHAM WOOD, jeweler, a subject of the King of Great Britain, residing at 55 Bridge street, Ramsbottom, in the county of Lancaster, England, have invented new and useful Improvements in Apparatus for Guiding Fabrics, of which the following is a specification.

This invention has reference to improvements in and connected with opening-out, guiding, or governing apparatus and means for delivering, straightening, opening out, and controlling the passage of woven fabrics to cloth stretching and treating machines, such as stenter-frames and the like.

The invention has particular reference to important detail improvements or modifications in the invention described in a former United States patent, No. 739,968, of 1903, which invention I have amplified by the improvements now about to be disclosed.

To aid in the explanation of this present invention, I have attached hereto drawings, to which I shall in my detailed description refer. Before entering upon such detailed description I will first describe what the various figures in the diagrams are intended to represent.

Figure 14:
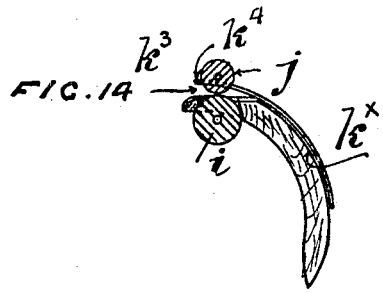
Figure 15:
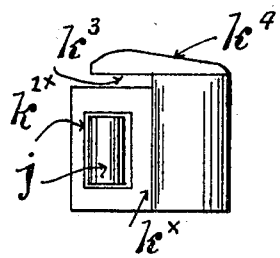
Figure 16:
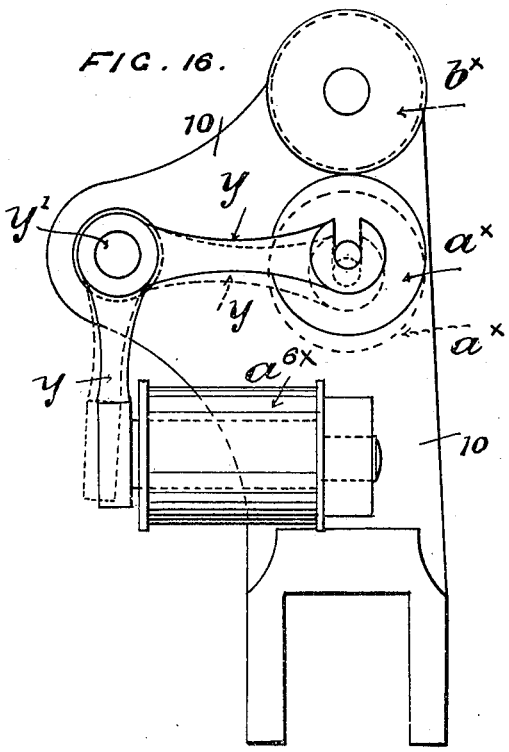
Figure 17:
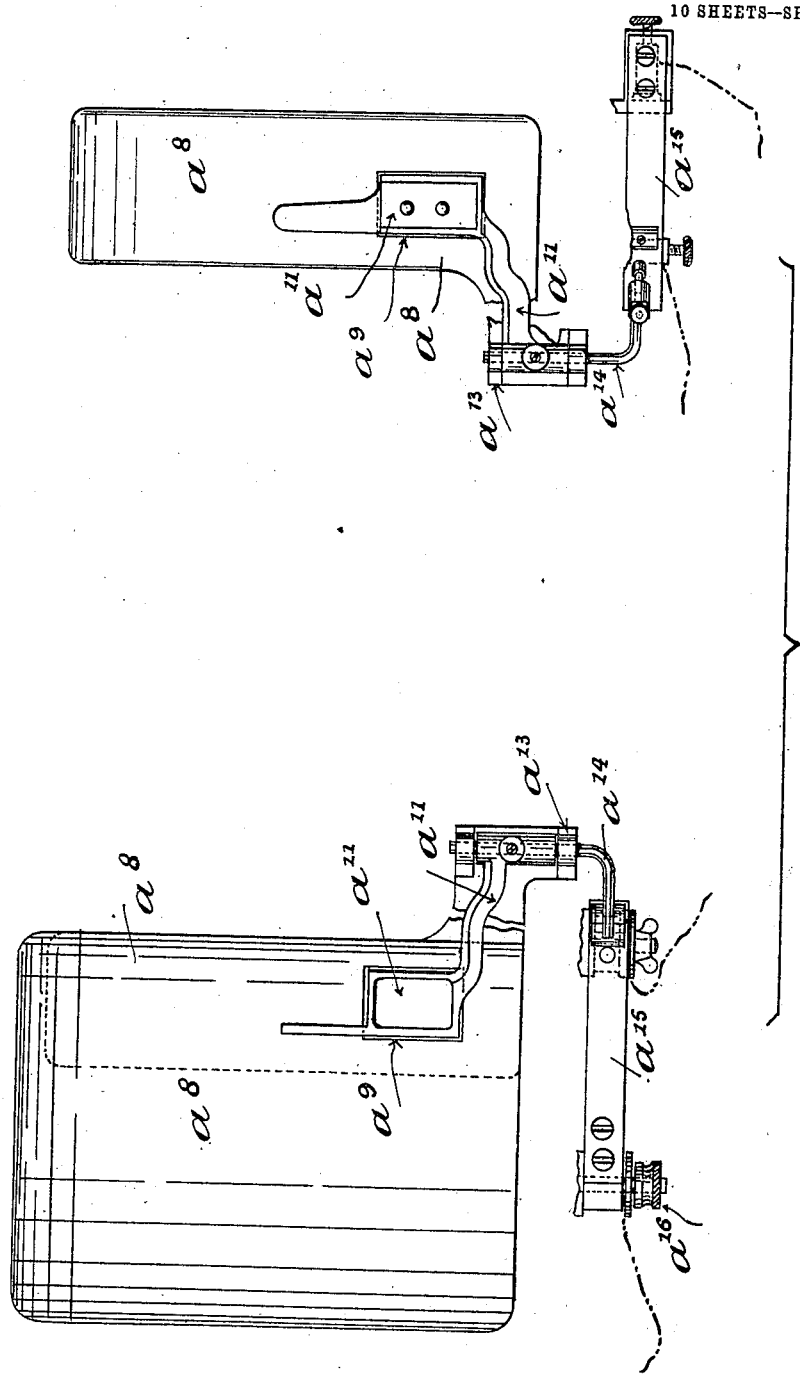
Figure 18:
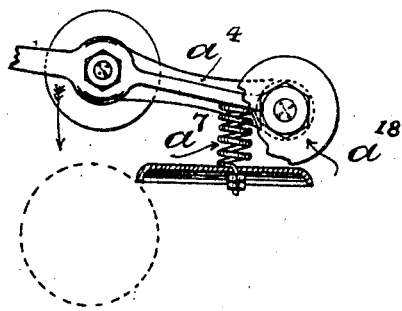

Figure 1 is a diagrammatic side elevation of part of my invention. Fig. 1ª is a like view, showing another part, the broken-away end of the stenter being clearly indicated on the right of this figure. Fig. 2 is a fragmentary plan view of Fig. 1ª. Fig. 3 is a broken front elevation of the pendent swinging arms which support the conical cages and also shows one of the conical cages. Fig. 4 is a detail section on the line A B, Fig. 1, and shows one of the brackets for the connecting-rod which extends between the swinging arms and stenter end. Fig. 5 is a detail section on the line C D, Fig. 1, and shows the adjustable bracket which is carried on the pendent swinging arms and which supports the rod or axle for each conical cage. Fig. 6 is a side elevation of two sets of electrically-controlled rollers which I prefer to use in connection with each selvage. Fig. 6ª is a detail view. Fig. 7 is a plan view of Fig. 6, the two Figs. 6 and 7 clearly showing my improvements in connection with such electrically-controlled rollers. Fig. 8 is a diagrammatic plan of Fig. 1 and clearly shows the conical and other cages and rollers, the pendent swinging arms, &c., being, however, omitted. Fig. 9 is a side elevation of the pair of rollers which may be used to hold and guide the cloth into the nip of the clips, and such view may be looked at in connection with Figs. 1ª and 2. Fig. 10 is an enlarged side elevation of the pair of rollers which may be used to hold and guide the cloth after it leaves the electrically-controlled rollers. This view should be looked at in connection with Figs. 1ª and 2. Fig. 11 is a detail section and shows one of the cages mounted on ball bearings. Fig. 12 is a modification showing cylindrical cages mounted at an angle one to another, the construction being such as to suit straight running. Fig. 13 is a diagrammatic front elevation, partly in section, and shows a modified way of adjusting the swinging arms and conical cages, the view being similar to a front elevation of Fig. 1. Figs. 14 and 15 are elevation and plan of a modification. Fig. 16 shows a modification in the way of mounting and moving the electrically-controlled governing-rollers into and out of contact one with the other. Fig. 17 and 18 are detail views.

I have shown my improvements in connection with the application of pairs of electrically-controlled rollers to the feeding and guiding of fabric to stenter-machines. In the drawings the first pair of electrically-controlled rollers are lettered *a b* and the second pair *a' b'*, while the stenter end is lettered S. In the case of Fig. 2 only the right-hand end of the stenter is shown and only the governing and other rollers on that side; but it will be understood that the parts are duplicated on the opposite hand and to suit the left-hand end of the stenter.

The first point of improvement which calls for detail explanation is that I find in practice where feeding to stenter-machines that after the cloth *c'* leaves the governing pair of rollers, such as *a' b'*, or the sets of governing pairs of rollers, where more than one set is used, some mechanical means should be utilized to insure that the cloth maintains the width resulting from the section of the governing-rollers. Unless some such means are provided the cloth is allowed to fall away or decrease, and so minimize the effect of the action of the electrically-controlled governing-rollers. One suitable form of mechanical device for this purpose consists of pairs of rollers, such as *d e*. (See Figs. 1ª and 2 and the separate detail view, Fig. 10.) One pair or set is used on either side of the stenter and each set consists of a lower roller *d*, which may be rubber-covered and mounted on an axle $d'$, said axle being secured to a bracket $f$, and an upper roller $e$, mounted on axle $e'$, which axle is pivoted to the bracket $f$ at the point $f'$, so as to permit of the upper roller being raised when the cloth is inserted. The upper roller may be a metallic serrated roller and may be suitably weighted. Instead of hinging the roller-spindle other means may be provided to allow of a ready insertion of the cloth. The roller-brackets $f$ may be conveniently mounted on adjustable brackets $g$, which are secured to main brackets $h$, which are bolted to the stenter end. In order to permit of the bracket $f$, and consequently the rollers $d$ $e$, being swiveled, so as to vary the angle of the rollers to the cloth, the bracket $g$ may have a rounded projection $g'$ fitting a hole in the bracket $f$, so that by slackening the bolt $g^2$ the bracket $f$ may swivel on the rounded projection $g'$ and the angle of the rollers to the cloth be adjusted. With the further object of keeping the cloth $C'$ to its desired width even after leaving this last described set of rollers $d$ $e$, and more particularly with the object of guiding and delivering the fabric to the nip of the first-acting stenter-clips, I propose in some cases to utilize second pairs of rollers $i$ $j$, the position and action of such pairs of rollers being clearly gathered from Figs. 1, 2, and 9. These pairs of rollers $i$ $j$ are preferably combined with a plate, such as $k$, the lower roller $i$ emerging through a slot or gap $k'$ cut in the plate $k$. In the drawings the plate $k$ is carried by a bracket $k^2$, which is fixed on the axle of the upper stenter clip-wheel, as clearly seen in Fig. 9, the bracket $k^2$ also supporting in jaws the lower roller $i$, which may be rubber-covered. The upper roller $j$, which may be serrated, is of a suitable weight or is weighted and is carried on an arm $j'$, secured to an axle $j^2$, carried in a bearing-bracket $j^3$, fixed to the usual cam-plate on either side of the stenter. The roller-arm $j'$ is designed to permit of the roller being raised when inserting the cloth, as is clearly indicated in Fig. 9. I may otherwise mount the rollers $i$ $j$ and the plate or I might dispense altogether with the plate $k$ and depend upon the action of pairs of rollers for gripping the cloth while the clips take hold.

In connection with the electrically-governed pairs of rollers which are disclosed in the aforementioned patent I have found that very considerable wear and tear occurs in connection with the links which were employed under said former patent to pull in or together the movable roller on each set when the armature was attracted. Having regard to this under my present invention, I dispense with such links altogether, and I cause the armature itself to hold in action the movable roller at the desired time. To this end, and as clearly shown in Figs. 6 and 7, which show two sets of electrically-controlled rollers, (marked $a$ $b$ $a'$ $b'$,) I mount the armature $a^3$ on or in connection with the hinged arm $a^4$, which is hinged at $a^5$. This hinged arm $a^4$ carries the movable roller $a$, while the connected coils or electromagnets $a^6$ $a^6$ are disposed so as to act on said armature when energized. This is a more direct arrangement and obviates wear and tear. A spring $a^7$ may raise the upper rollers $a$ $a'$ out of action. I also find that in using a plate (called "contact-plate" in the said former patent) and finger that starch or dressing or fibers are liable to accumulate on said plate and underneath the finger so to interfere with the automatic action of the rollers by not allowing the circuit to be completed or closed. According to this invention I now slot or cut away the plate, such as the plates marked $a^8$ in Figs. 6, 7, and 17, at the points $a^9$ where the finger or a projection thereon would bear against said plate. For instance, I may use fingers, such as the fingers $a^{11}$, and when the squared or other lower faces of said fingers fall or partially fall through the slots $a^9$ in the plates $a^8$ the contact is made. Said fingers $a^{11}$ may be pinned on or otherwise carried by rods $a^{12}$, mounted in jawed brackets $a^{13}$, forming a part of the base or support for the plates $a^8$, the said rods $a^{12}$ carrying or being secured to arms $a^{14}$, which when the finger falls presses on flat springs $a^{15}$, so that said spring in each case completes or closes the circuit, and the armatures $a^3$ are attracted and the roller pulled into action. In Figs. 6 and 7 the wiring is clearly indicated by the dash and double-dot line, the terminal wires from the dynamos or batteries being connected up at suitable points, as the points $a^{16}$ $a^{17}$, suitable provision for insulation being duly made where requisite. In the left-hand half of Fig. 6 the armature is shown attracted and the rollers $a$ $b$ in action, while in the right-hand half the spring $a^{15}$ is out of contact and the rollers $a'$ $b'$ out of action, the arm $a^4$ being maintained raised by the spring $a^7$, Fig. 18, or otherwise. The precise arrangement for making and breaking contact may vary, the important feature being the provision of the slot or gap $j$ and the operating-finger acting in conjunction therewith. With such a slot or gap and finger arrangement any foreign matter tends to fall through the slot or gap and is so got rid of, or in case it sticks to the finger it falls with the finger into the slot or gap when the cloth is drawn away.

To allow of more considerable and more ready radial adjustment, I mount both governing-rollers $a$ $b$, plate $a^8$, fingers, arms, armatures, and coils, &c., upon the one bracket $a^{18}$, which is or may be carried on a second bracket $l$, this second bracket $l$ having a center stud $l'$, which engages a hole in the main bracket $a^{18}$, a slot $l^2$ being formed in the lower bracket $l$, so that by clamping up a bolt $l^3$ the radial adjustment of the main bracket $a^{18}$ is secured. The sets of rollers $a\ b\ a'\ b'$ are normally and as a general rule set with their inner ends forward, as indicated in Fig. 2, the disposition of the rollers at right angles, as in Figs. 6 and 7, being merely for ease of illustration. The brackets $l$, of which one is shown in side view, Fig. 6$^a$, may be secured to and made adjustable upon a wooden or other support $m$ by means of clamping-nuts $m'$, which pass through slots $m^2$, and said wooden support may be adjustable transversely on a supporting-bracket, such as $n$, or otherwise, of suitable design, which is secured to the bracket $h$, bolted to the stenter end. This way of mounting the brackets carrying the electrically-controlled pairs of rollers may be varied, as will be obvious.

As already stated, I prefer to employ two sets of electrically-controlled governing-rollers for each selvage, and it will be understood that the parts instanced are used on either side of the stenter end or on either side of the machine, as the case may be, but that they are of opposite hand.

In feeding the cloth to my electrically-controlled governing-rollers preparatory to passing to an ordinary straight-running stenter I may, as shown in Fig. 12, use two light cylindrical rollers, or it might be, for the sake of lightness, two cages $o$, having cylindrical ends $o'$ and spaced bars $o^2$, and these two cages are adjustably mounted on bars or axles $p$, inclined to one another, so that the cloth from the beam or batch is bellied or fed at a narrower width, and thus some reserve exists, so that in the case of a sudden call from the governing-rollers on one side there is no tendency for the cloth to be pulled out of the governing-rollers on the opposite side. Either set of governing-rollers then always has power to pull outward the cloth, the rotatable cylindrical cages $o$ serving well to evenly feed the fabric in a bellied form.

To utilize electrically-controlled governing-rollers either in one or more sets with a "swissing-frame" or jigging-stenter, I use rollers or cages which belly the fabric, and I find it necessary to allow these rollers or cages to be free to yield. Preferably I use skeleton cages $q\ q$, and I prefer to make them of conical formation, as clearly shown in Figs. 1, 3, and 8, and I dispose the skeleton cages as a usual thing at a dipping angle one to another (see Figs. 3 and 13) and preferably with the smaller end set slightly forward, (see Figs. 1 and 8,) the cages being secured to pendent arms $r$, carried on an overhead shaft $r'$, suitably supported. To carry the conical cages $q\ q$, I may mount them on arms $q'$, socketed in brackets $q^2$, (see Figs. 1 and 5,) the set-screw $q^3$ allowing the inclination of the arms to be adjusted, while the brackets $q^2$ allow each arm and cage to be adjusted radially around the swinging or movable arms $r$ and also vertically upon said arms. The pendent movable or swinging arms $r$ are connected to the brackets $h$ or otherwise to the stenter ends on either side by a connecting-rod, such as $s$, the end of which rod passes through a slot in a bracket $t$, adjustable on the arm $r$. (See Figs. 1 and 4.) The rod carries a collar $t'$, which prevents disengagement of connecting-rod and arm $r$, while a spring $s'$ is confined between the bracket $t$ and a collar $s^2$, adjustable along the connecting-rod. The forward end of each connecting-rod $s$ engages loosely a bearing on the bracket $h$. This form of spring or yielding connection allows either cage $q$ to yield independently.

When the end of the stenter moves back on either hand, the conical cage $q$ on either hand moves back in unison and carries with it the cloth on that side, while in the case of a tight selvage the cage would yield forward against the spring $s'$. In case the tightness should be followed by a slackness then the spring compensates and thrusts back the particular cage, either cage moving independently, and so dealing with the cloth at either side. It will be seen that by this arrangement an independent and automatic movement and control takes place in connection with either side of the cloth.

The cloth $C'$, coming from the batching-beam $l$, passes over a suitable number of guiding rollers or bars, which may be of any convenient description. In the arrangement shown in the drawings the cloth passes first under a roller $u$, preferably made in two independent parts, and then over a skeleton drum $v$, preferably in two parts, and then under a roller $w$, which is also preferably in two parts, and from thence over the compensating cages $q$, which belly the cloth somewhat. From the conical or other compensating cages the cloth passes to the pairs of electrically-governed rollers $a\ b\ a'\ b'$ or to a single set or combination of electrically-governed rollers, and thence through the rollers $d\ e$ and the rollers $i\ j$, whereupon the clips of the swissing-stenter take a hold on the cloth.

Where swissing does not take place, then the swissing-arms $r$ may be secured to the connecting-rods and the rollers and parts just used as for ordinary straight running.

I prefer in most cases where feeding cloth to various machines to use prior to the cages $o$ or $q$ one or more sets of grinding-rollers, which are in two parts or consist of separate halves, so that in case of a very tight selvage and a very slack selvage the one roller is rotated and eases the feed, while on the slack-selvage side the roller tends rather to retard the cloth or in any case does not revolve so readily as the roller at the tight-selvage side. I also prefer to mount both conical cages and also the cages $o\ v\ q$ or the rollers on ball-bearings, and this can be conveniently done by using a shaft 3, having a squared portion, and a sleeve 4, fitting such shaft, ball-races 5 6 being fashioned at either end in connection with the sleeves and cages, &c., as is sufficiently indicated in Fig. 11.

Instead of adjusting the pendent swinging arms by stop-collars, as is indicated in Fig. 3, I may form the overhead supporting-shaft $r'^\times$ with a right and left hand thread, with which nuts in connection with the arm $r^\times$ engage, so that by rotating said shaft—say by a chain 7 and chain-wheels 8 9—the arms can be set in or out to suit the desired width of fabric, as is indicated clearly in Fig. 13.

As a modification in the plate $k$ used in connection with the rollers $i$ and $j$ and as indicated in Figs. 14 and 15 I may fashion such plate in one with the cam-plate on either side. In such case the plate $k^\times$ would be slotted at $k'^\times$ and have rollers $i$ $j$ and the stenter-clips would be disengaged by the shaped raised edge $k^4$, the said plate $k^\times$ having a side slot $k^3$ to allow the clips to take hold of the fabric.

As a further modification in connection with the electrically-controlled pairs of rollers and under this invention I may instead of lifting the upper roller $a$ out of action allow the lower roller $a^\times$ to fall out of action by its own weight or to be quickly moved out of action by a spring when the armature is released, and this could be conveniently accomplished, as indicated in Fig. 16, wherein the upper roller $b^\times$ is mounted in bearings in the bracket 10, while the lower roller $a^\times$ is mounted in connected bell-crank levers $y$, pivoted at $y'$, or is otherwise mounted in a cradle free to fall clear of the upper roller. In this case one arm of the bell-crank lever forms the armature or an armature is secured to or in connection with the bell-crank or cradle, which armature is acted on by coils or electromagnets, such as those marked $a^{6\times}$. (Shown in the Fig. 16.) In this case the whole of the operative parts might be carried on one bracket, such as the bracket 10, which would be adjustably secured to the stenter or to a bracket secured to the stenter or otherwise arranged in connection with the machine to be fed.

In place of or as a modification of the pendent conical-cage arrangement for feeding to swissing-stenters the compensating cages might be adjustably mounted on two swivel-arms carried in or by a standard or support, the swivel-arms being connected to the stenter ends through spring connections, as will be understood. The arrangements for guiding the cloth to the cages or such swivel-arms may be such as are herein indicated or other suitable guiding arrangements may be used.

In connection with either or both selvages loose rollers mounted on hinged arms may be used to bear on the cloth just after leaving the batching-beam.

Under this present invention I may use pairs of electrically-controlled rollers, as herein described, to guide the cloth coming from the lap of a wagon and preparatory to its reaching the rollers or cages, such pairs of electrically-controlled rollers being used in connection with each selvage and for the purpose of dispensing with hand labor. It will also be obvious that one or more pairs of electrically-controlled rollers having the improvements herein described may be used in connection with other forms of rollers or appliances which deal with the cloth before and after it leaves such electrically-controlled rollers when such latter rollers are used to feed and guide cloth to various kinds of machines.

I declare that what I claim is—

1. In an apparatus of the class described the combination with pairs of electrically-controlled rollers and fingers, and a slotted plate on which the fingers act and rollers located close to the nip of the fingers and holding the cloth and feeding it into the nip of the fingers, substantially as described.

2. In an apparatus of the class described, a roller journaled therein, a pivoted arm, a second roller journaled in said arm and adapted to contact with the first roller, an armature on said arm, a coil and means whereby the armature is normally kept out of contact with said coil.

3. In an apparatus of the class described, a roller, a pivoted arm, a second roller carried by said arm and adapted to contact with the first roller, an armature on the arm, a coil, a main radially-adjustable bracket supporting said parts and a support for said bracket, substantially as described.

4. In a stenter-machine, arms having movement, supports carried by said arms, rollers carried by said supports and elastic connections between the movable arms and the stenter ends, substantially as described.

5. In combination with electrically-controlled guiding and opening rollers, cages or rollers suitably supported, elastic connections to allow the cages or rollers to yield and preliminary guide-rollers for guiding the fabric from the batch to the cages or rollers substantially as described and shown.

6. In an apparatus of the class described, an upper roller, a pivoted arm, a lower roller journaled in said arm and adapted to contact with the upper roller, an armature on said arm and a coil for attracting the armature to move the lower roller in contact with the upper roller.

7. In combination with a stenter or like machine, preliminary guide-rollers, movable cages free to yield, connections between said cages and stenter end, electrically-controlled governing-rollers, and one or more pairs of auxiliary selvage-rollers all for the purposes and substantially as described.

8. In combination with a stenter or like machine, preliminary guiding means for the cloth, yielding cages, connections for said cages to the stenter end, electrically-controlled guiding-rollers, and means for rendering the width of the cloth uniform after leaving the electrically-controlled pairs of rollers substantially as described and shown.

In testimony whereof I have signed my name to this specification in the presence of two subscribing witnesses.

ABRAHAM WOOD.

Witnesses:
 RICHARD WEBSTER IBBERSON,
 NORMAN KIEMAN.